INVENTOR.
FREDERICK C. WILLIAMS,
BY J. K. Haskell
ATTORNEY.

DATA RECORDING AND READOUT SYSTEM
Filed June 22, 1965 8 Sheets-Sheet 2
FIG. 2(a)
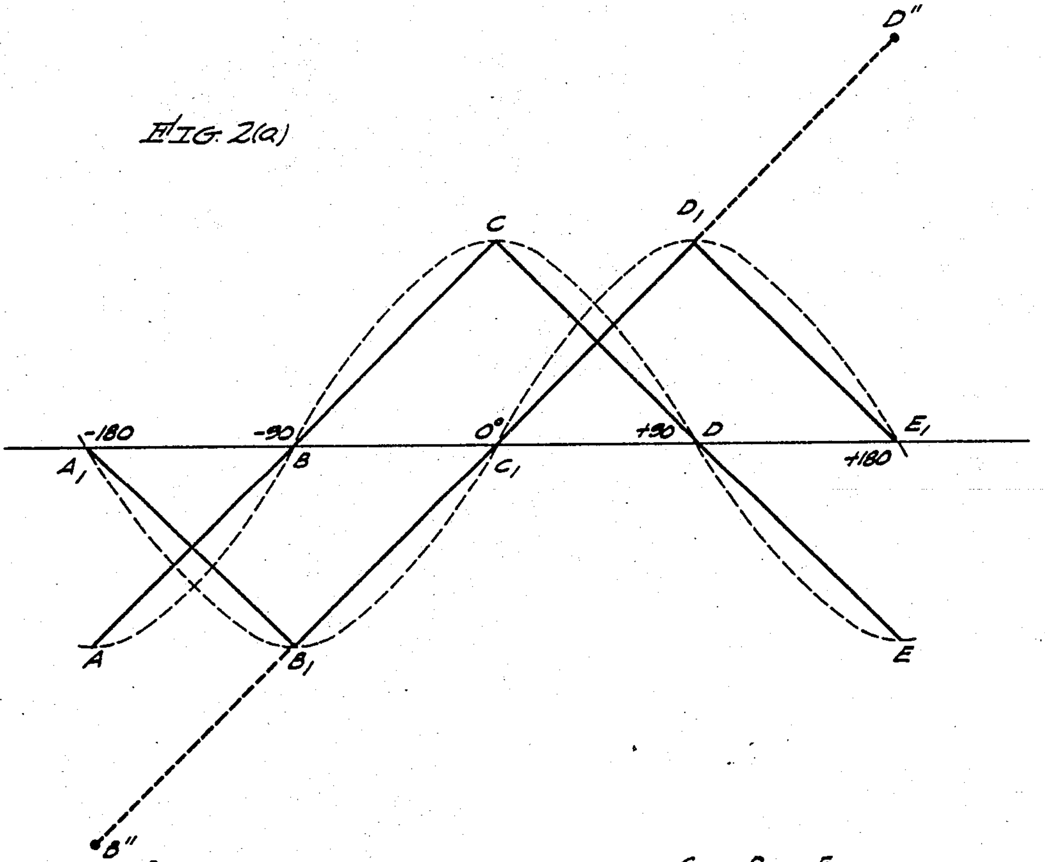
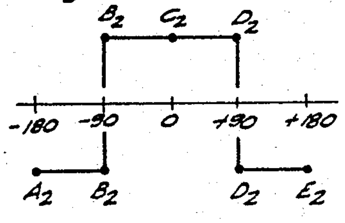
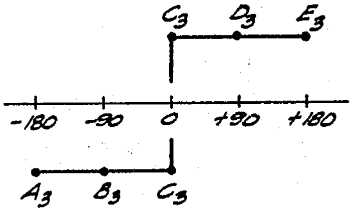
FIG. 2(b). FIG. 2(c).
INVENTOR.
FREDERICK C. WILLIAMS,
BY J. K. Haskell
ATTORNEY.

INVENTOR.
FREDERICK C. WILLIAMS,
BY J. K. Haskell
ATTORNEY.

DATA RECORDING AND READOUT SYSTEM

Filed June 22, 1965 8 Sheets-Sheet 4

INVENTOR.
FREDERICK C. WILLIAMS,
BY J. K. Haskell
ATTORNEY.

INVENTOR.
FREDERICK C. WILLIAMS,
BY J. K. Haskell
ATTORNEY

INVENTOR.
FREDERICK C. WILLIAMS,
BY J. K. Haskell
ATTORNEY.

June 6, 1967 F. C. WILLIAMS 3,324,466

DATA RECORDING AND READOUT SYSTEM

Filed June 22, 1965 8 Sheets-Sheet 7

INVENTOR.
FREDERICK C. WILLIAMS,
BY J. K. Haskell
ATTORNEY.

INVENTOR.
FREDERICK C. WILLIAMS,
BY J. K. Haskell
ATTORNEY.

3,324,466

DATA RECORDING AND READOUT SYSTEM

Frederick C. Williams, Manhattan Beach, Calif., assignor to Hughes Aircraft Company, Culver City, Calif., a corporation of Delaware Filed June 22, 1965, Ser. No. 465,940
16 Claims. (Cl. 343—5)

ABSTRACT OF THE DISCLOSURE

The present invention is a system for recording on film and reading out the in-phase and quadrature signal returns for each sweep of a radar antenna, the signals being combined into signals measuring the amplitude and phase. After sampling the amplitude of each radar signal at the PRF, the signals are recorded by amplitude modulation on film by use of a flying spot scanner. Phase measurements are recorded as X-position modulation on the same film. For film readout, the recorded data is read out as a series of pulses whose voltage level is the amplitude at the instant of sampling, and whose time jitter is a measure of the phase at that time.

This invention relates to a data handling system and more particularly to a novel system for recording and reading out signals.

The importance of radar in both commercial and military fields has led to the development of many different systems for receiving and analyzing radar data, in order to gain information about targets located at particular ranges of interest.

Until recently, most of the information was obtained by analyzing the received radar signals and determining the amplitude characteristics thereof. In recent years however, systems have been developed, whereby significant radar information is derived by analyzing, not only the amplitudes of the received signals, but also the phase characteristics of the received signals with respect to some reference signal. In some systems, the received signals are combined with additional signals generated in the radar receiver to produce in-phase and quadrature signals from which the desired radar information is derived. The proper handling of the received signals and combining them with other signals has presented technical problems which herebefore could only be solved with highly complex and specialized equipment. This is particularly true where the received data signals are to be recorded and subsequently read out for analysis purposes. Thus, a need exists for a relatively simple technique and system for recording and reading out in-phase and quadrature signals in order to derive the desired information.

Accordingly, it is an object of the present invention to provide a novel system for recording amplitude and phase characteristics of received signals.

Another object of the invention is the provision of a novel system for analyzing amplitude and phase characteristics of recorded signals to provide related in-phase and quadrature signals.

Still another object is to provide a relatively simple data recording and readout system in which amplitude and phase characteristics of input signals are reproduced into related in-phase and quadrature output signals.

A further object of the invention is the provision of a new system for recording amplitude and phase characteristics of a series of received radar signals, and for reading out the characteristics of portions of the signals related to a particular range to derive amplitude and in-phase and quadrature phase data therefrom.

These and other objects of the invention are achieved by providing a system wherein the amplitude and phase characteristics of all the signals of each radar sweep or trace, received at the pulse repetition frequency (PRF), are recorded on film as a separate trace by means of a recording instrument such as a flying spot scanner cathode ray tube (CRT). The amplitude of each signal is recorded by controlling the intensity of the electron gun of the CRT, while the phase is recorded as modulation on the film along an X axis which is parallel to the motion of the film. The CRT is provided with a sweep generator in order to separate along each recorded trace, in a Y axis perpendicular to the direction of motion of the film, the amplitude and phase information of signals from different range elements of the received radar sweep. Thus, for each range element, the amplitude and phase information of the signal received therefrom, are recorded at the PRF rate, hereafter, also referred to as the sampling frequency.

The recorded amplitude and phase information of sampled signals over a particular range of interest are read out from the film along a line in the X axis at a particular value on the Y axis. Such information is presented as a series of pulses whose voltage levels are the amplitudes at the instants of sampling and the time relationship or spacings therebetween is a measure of their phase at such instants. The series of pulses is then synthesized to produce in-phase and quadrature signals which are related to the input signals over the particular range of interest.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a novel data recording system of the present invention;

FIGURES 2(*a*), 2(*b*) and 2(*c*) are signal diagrams useful in explaining the operation of the system shown in FIGURE 1;

FIGURE 3 is an expanded view of a strip of film on which data is recorded by the system of FIGURE 1;

FIGURES 4(*a*) through 4(*g*) are waveform diagrams useful in explaining the operation of the readout system of the present invention;

Figure 9:
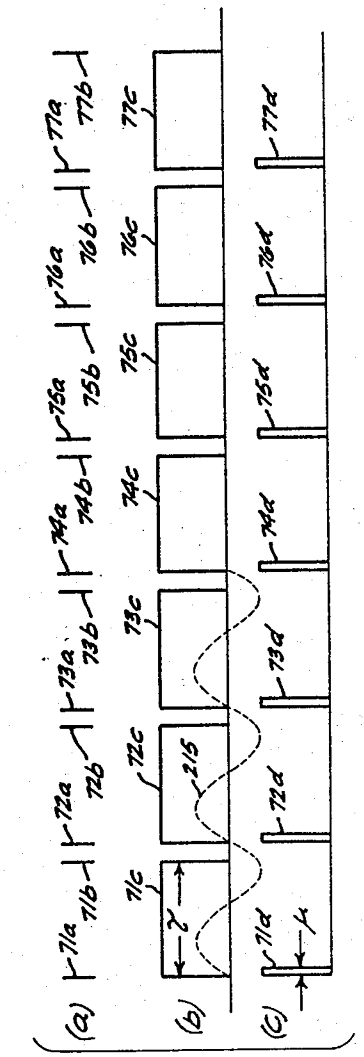
Figure 5:
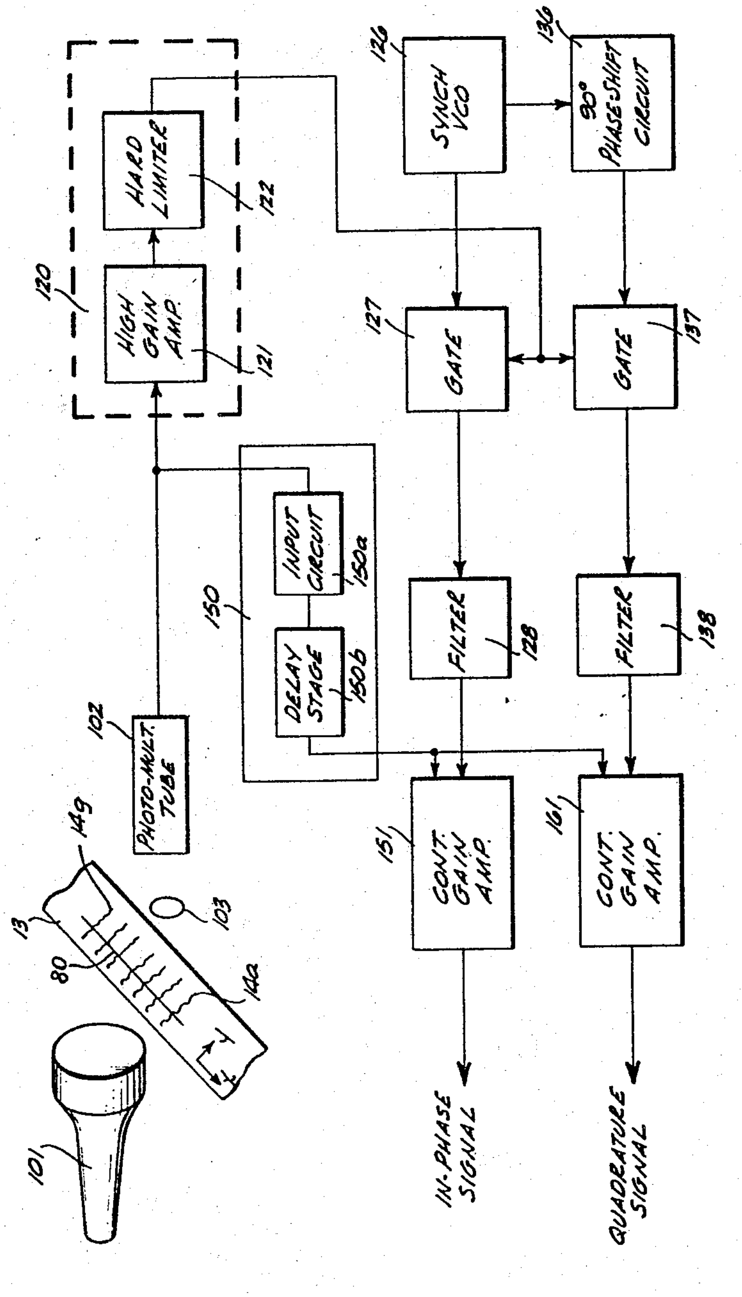
FIGURE 5 is a block diagram of the data readout system of the present invention.
Figure 6:
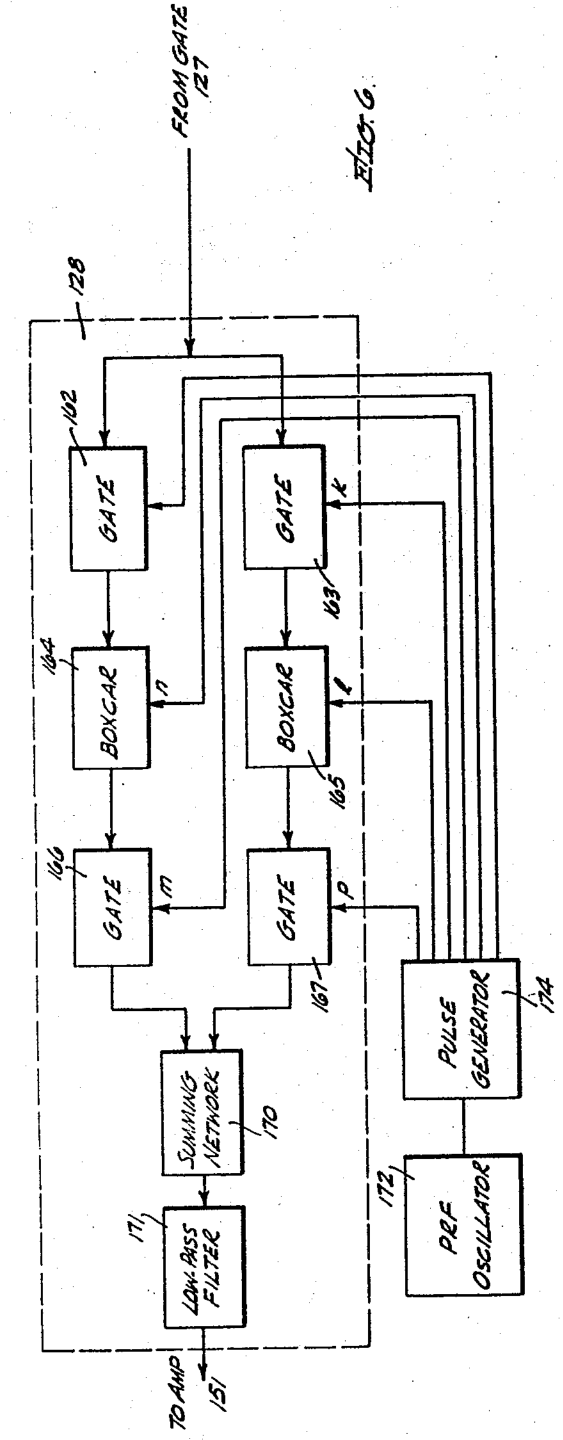
FIGURE 6 is an expanded block diagram of a portion of the readout system shown in FIGURE 5.
Figure 10:
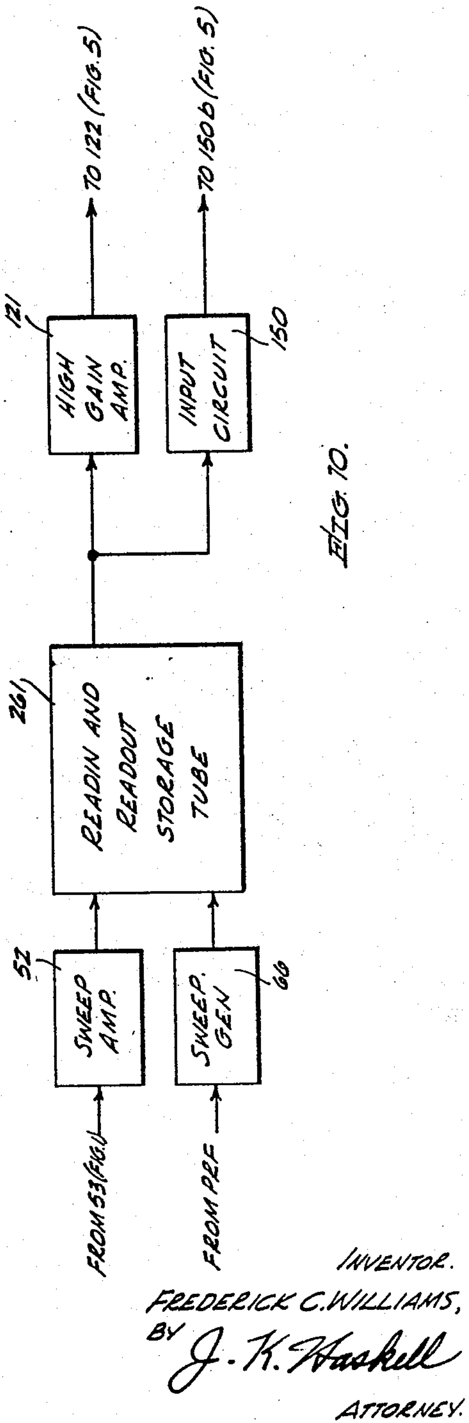
Figure 7:
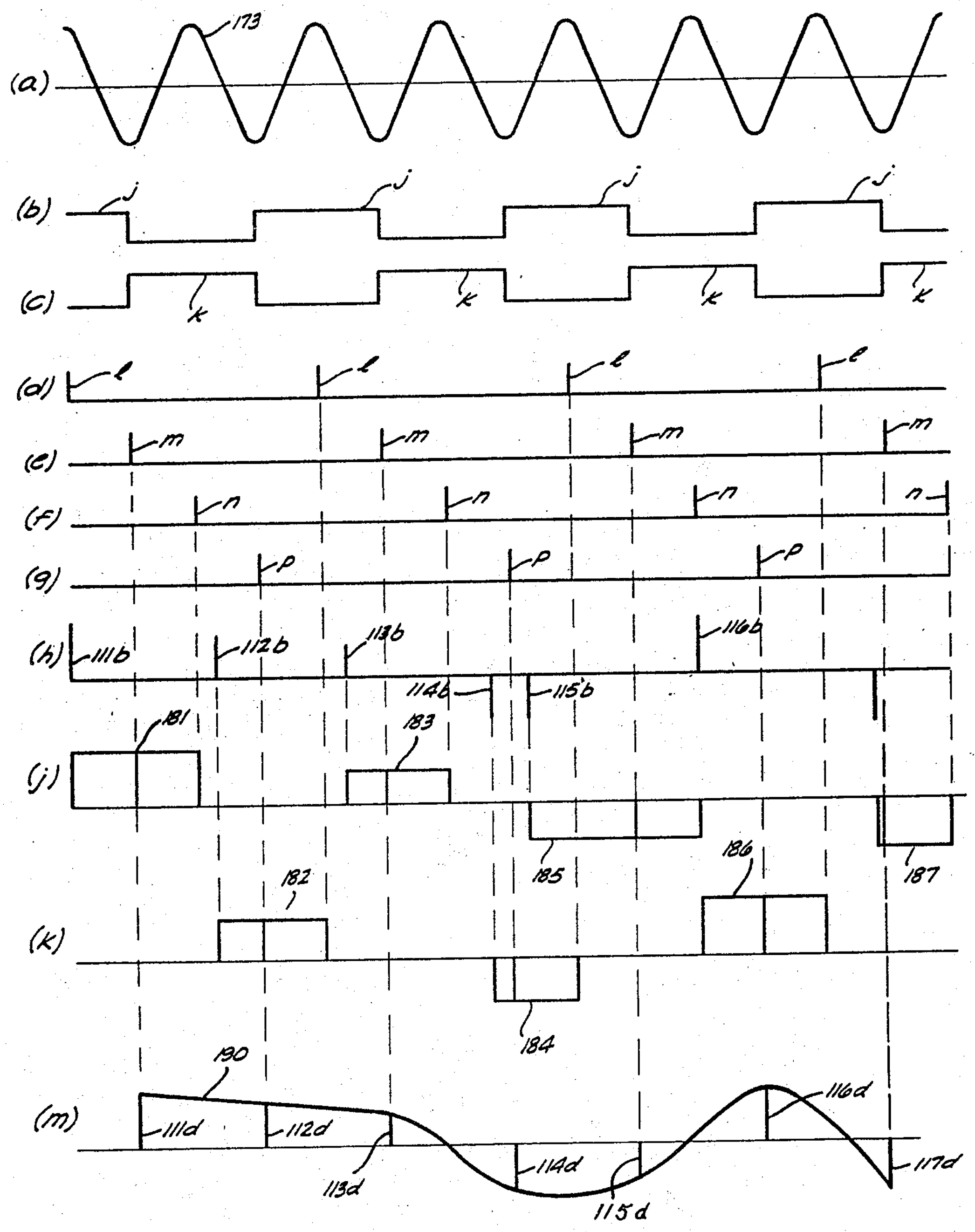
Figure 8:
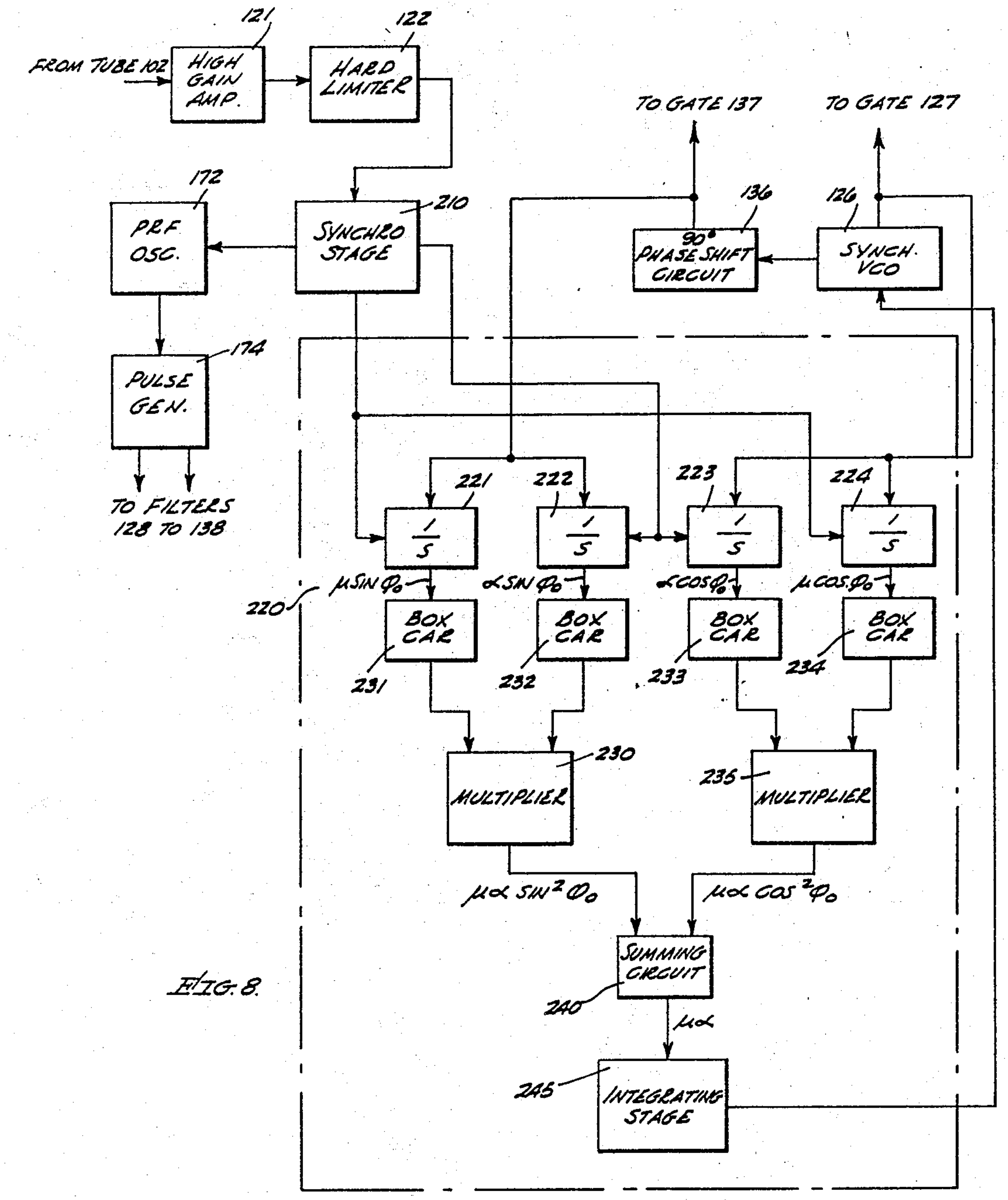

FIGURES 7(*a*) through 7(*h*) and 7(*j*), 7(*k*), and 7(*m*) are waveform diagrams useful in explaining the operation of the circuitry shown in FIGURE 6;

FIGURE 8 is an expanded block diagram of another portion of the readout system shown in FIGURE 5;

FIGURES 9(*a*), 9(*b*) and 9(*c*) are waveform diagrams useful in explaining the operation of the circuitry of FIGURE 8; and FIGURE 10 is a simplified block diagram of an arrangement utilizing a readin and readout storage tube.

Figure 1:
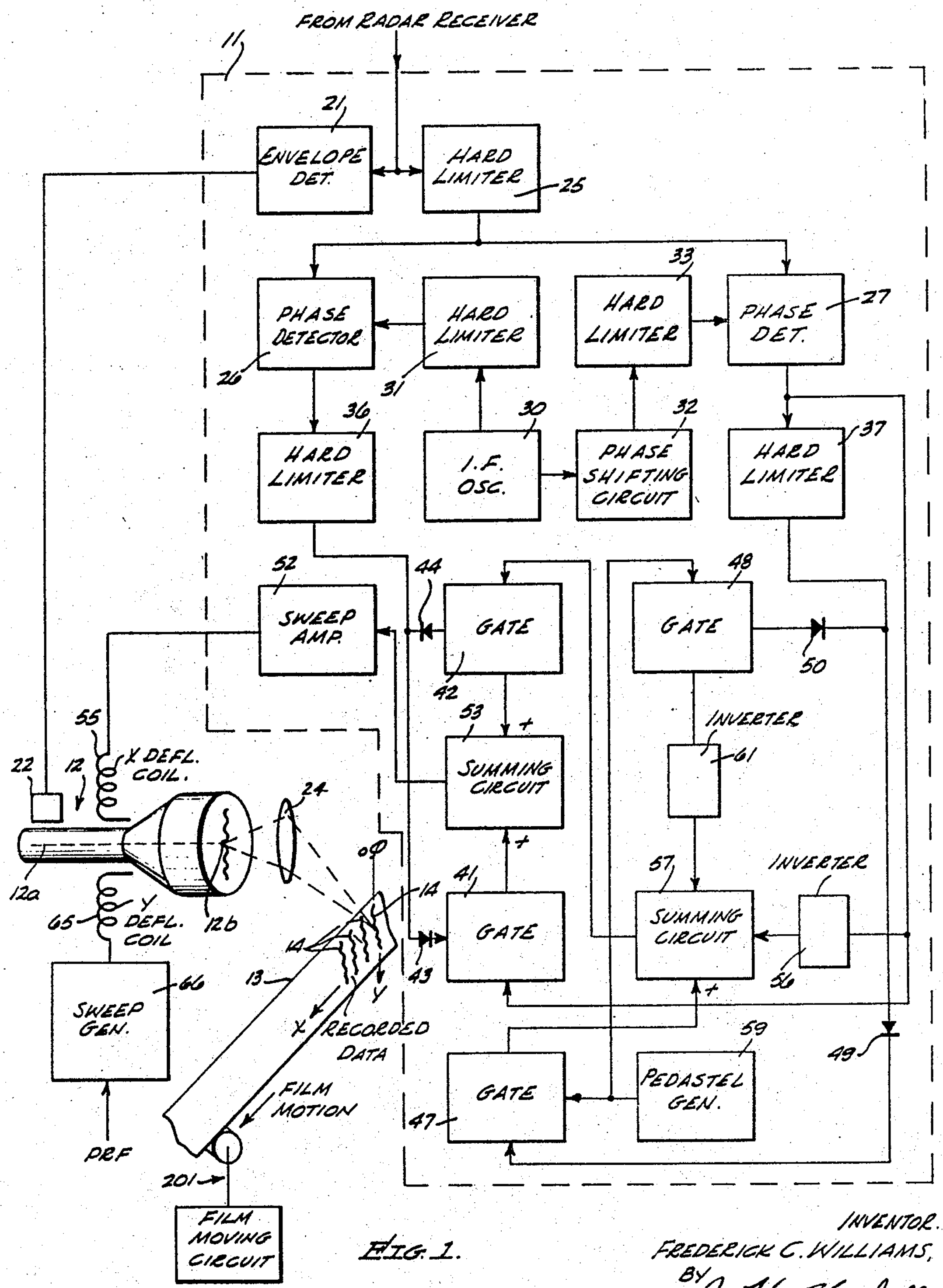

Referring to FIGURE 1, there is shown an input recording stage 11 connected to a flying spot scanner CRT 12 which is used to record on film 13 traces 14. In each trace, which comprises a plurality of exposed points or incremental areas, are recorded the amplitude and phase characteristics of all the signals in each radar sweep supplied to the stage 11. For explanatory purposes, let it be assumed that stage 11 is supplied with a series of range-gated coherent intermediate frequency (IF) video signal sweeps from the output of a radar or sonar receiver. Hereafter, though the sweeps will be referred to as radar sweeps, the term radar should be assumed to include range sweeps received by sonar systems. Within each sweep, the signal at any given instant representing the received signal from a particular range, can generally be expressed as $A \cos(\omega t-\phi)$. A is the amplitude of the received signal; $\omega t$, the frequency with respect to a reference frequency such as the receiver's IF stage and $\phi$ is the change in frequency of phase relationship of the received signal with respect to the reference signal.

The input signal is supplied to an envelope detector 21 which detects the amplitude A of the signal, and supplies it to a beam intensity control circuit 22, used to control or modulate the intensity of an electron beam 12*a* of the CRT 12. The spot of light on the CRT screen (12*b*) whose brightness is proportional to the beam intensity is focused onto the film 13, by a lens 24, so that the intensity with which the film is exposed is related to the amplitude A of the input signal.

The input signal is also supplied through a hard limiter 25 to a pair of phase detectors 26 and 27. Detector 26 is directly connected to an oscillator 30 through a hard limiter 31, while detector 27 is connected to the oscillator 30 through serially connected 90° phase shifting circuit 32 and a hard limiter 33. As shown in FIGURE 1, the oscillator 30 is designated as an IF oscillator, it being assumed that the frequency thereof is the reference frequency used to determine the phase characteristics of the received input signals. Thus, the output of the IF oscillator 30 can be expressed as $\cos(\omega t)$ and the output of circuit 32 as $\sin(\omega t)$.

These two signals, after being hard limited, are combined in detectors 26 and 27 with the hard limited signal $A \cos(\omega t-\phi)$. If the signals had not been hard limited in detector 26, the combined signal could be expressed as $\frac{1}{2}[A \cos\phi+A \cos(2\omega t-\phi)]$, whereas in detector 27 a signal would be produced which is expressable as $\frac{1}{2}[A \sin\phi+A \sin(2\omega t-\phi)]$. The higher frequency terms can be filtered out so that the outputs of detectors 26 and 27, which are hard limited by limiters 36 and 37, would be cos and sine functions respectively of the phase angle $\phi$. Namely, the output of limiter 36 would be $\cos\phi$ and the output of limiter 37 would be $\sin\phi$.

As is appreciated by those familiar with the art, the effect of hard limiting the two input signals to phase detector 26, by hard limiters 31 and 25, is to convert from a cosine signal, shown by a dotted line between points ABCDE in FIGURE 2(*a*), to which reference is made herein, to the signal diagrammed by the solid line between the same points. In like manner, the effect of hard limiting the two inputs to phase detector 27, by limiters 33 and 25, is to convert from a sine signal, shown by a dotted line between points $A_1B_1C_1D_1E_1$ of FIGURE 2(*a*), to the signal shown by the solid line between the same points.

The hard limited values of signal ABCDE, i.e. the output of hard limiter 36, is shown in FIGURE 2(*b*) as $A_2B_2C_2D_2E_2$, and the hard limited values of signal $A_1B_1C_1D_1E_1$ out of hard limiter 37 is shown as $A_3B_3C_3D_3E_3$ in FIGURE 2(*c*).

As previously explained, according to the teachings of the invention, it is necessary to record the phase difference $\phi$ of the input signal on the film 13 (FIGURE 1) as linear modulations along the X axis on each of traces 14. This can be easily accomplished if the phase difference $\phi$ can be recorded as a function of a straight line such line B″B′C′D′D″.

As seen from FIGURE 2, between −90° and +90°, i.e. when the hard limited output of detector 26 is positive as indicated by line $B_2C_2D_2$ [FIGURE 2(*b*)], the output of detector 27 is quite linear, as seen from line $B_1C_1D_1$ [FIGURE 2(*a*)]. Between +90° and +180°, when the hard limited output of detector 26 is negative (line $D_2E_2$), and the hard limited output of detector 27 is positive (line $D_3E_3$), the desired signal is represented by dashed line $D_1D''$. The signal $D_1D''$ can be expressed as a pedestal value $D''E_1$, less the output of detector 27 ($D_1E_1$). The pedestal value is equal to the peak to peak amplitude of the output of either phase detector. Similarly, when the hard limited outputs of both detectors are negative, as indicated by lines $A_2B_2$ and $A_3B_3$, the desired signals are represented by a dashed line $B_1B''$. Line $B_1B''$ can be expressed as minus the pedestal value $A_1B''$ which equals $D''E_1$, minus the output of detector 27 ($A_1B_1$).

Producing an output which is linearly related to the phase angle $\phi$ may be electronically accomplished by supplying the output of limiter 36 to gates 41 and 42 (FIGURE 1) through diodes 43 and 44. The hard limited output from limiter 37 is supplied to gates 47 and 48 through diodes 49 and 50, respectively. The output of detector 27 is directly supplied to gate 41 so that when the hard limited output of phase detector 26 is positive (line $B_2C_2D_2$), gate 41 is open. This enables the output of phase detector 27 (line $B_1C_1D_1$) to pass therethrough. Therefrom, the signal is supplied to a sweep amplifier 52 through a summing circuit 53. The amplifier 52 is connected to an X deflection coil 55, which modulates the electron beam 12*a* of CRT 12 in the X axis as a function of the amplitude of the signal from the amplifier 52.

The output of detector 27 is also supplied to an inverter 56 which is connected to a summing circuit 57. A pedestal generator 59 generates a signal equal to the pedestal signal herebefore referred to. The generator 59 is connected to the gates 47 and 48. Thus, when the hard limited outputs of detectors 26 and 27 are negative and positive respectively, namely when the phase angle is between +90° and +180°, gates 42 and 47 are open so that the signal from the pedestal generator and the inverted or negative value of the output of detector 27 are combined in circuit 57, and therefrom supplied to amplifier 52 through gate 42 and circuit 53. As a result, the electron beam is modulated by signals varying in amplitude as represented by line $D_1D''$. The output of gate 48 is connected to circuit 57 through an inverter 61 so that when the hard limited outputs of both detectors 26 and 27 are negative (lines $A_2B_2$ and $A_3B_3$), gates 42 and 48 are open. Consequently, circuit 57 sums up the negative of the pedestal signal and the negative of the output of detector 27. The summed signal is supplied through gate 42 and circuit 53 to amplifier 52 so that when the phase difference is between −180° to −90°, the beam is modulated by signals having amplitudes designated by line $B''B_1$.

From the foregoing, it is thus seen that the input recording stage 11 converts the phase characteristics ($\phi$) of the input signals with respect to the phase of a reference signal (oscillator 30) to a linear signal (line B″D″). This signal is used to X modulate the electron beam of the CRT so that the phase angle of the signal is recorded as X modulation on the film 13. The amplitude of the input signal is recorded by modulating the intensity of the beam in a manner herebefore explained. As seen from FIGURE 1, the CRT 12 is also provided with a Y deflection coil 65 connected to a sweep generator 66. The generator is actuated by signals synchronized with the pulse repetition frequency (PRF) so that the beam is modulated in the Y axis perpendicular to the motion of the film 13, in order to separate the recorded signals from different range elements of the radar return during each radar sweep.

Figure 3:
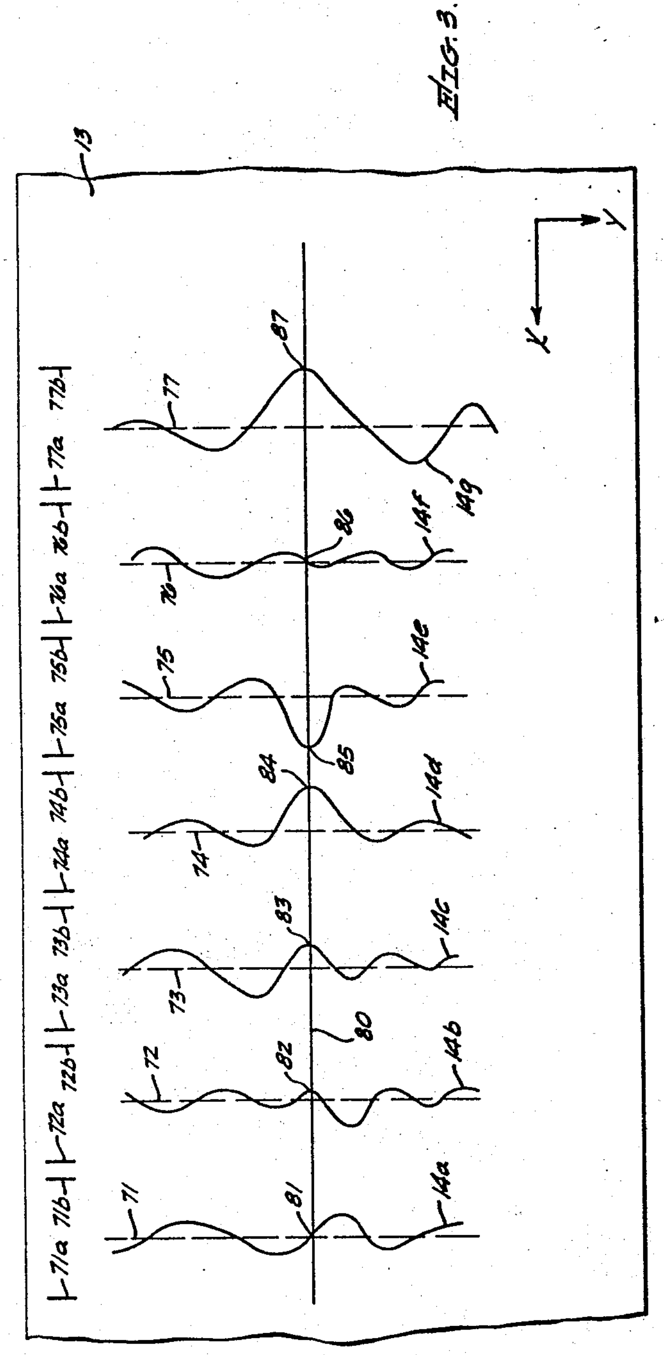

Reference is now made to FIGURE 3 which is an expanded view of the film 13 on which are recorded a plurality of traces, designated 14*a* through 14*g*. These traces correspond to traces 14 shown in FIGURE 1. The points in traces 14*a* through 14*g* have been modulated in the X axis about dashed lines 71 through 77 respectively. These lines represent signals with zero phase shift, i.e. $\phi=0$. From the foregoing, it should be appreciated that in each trace the X modulation of each point represents the phase characteristic of a received radar signal from a particular target, whereas the intensity of the point represents the amplitude of the received signal. Thus, for example, the intensities and X positions of points 81 through 87 along a line 80 in traces 14a through 14g, respectively, contain the amplitude and phase characteristics of signals received during seven successive radar sweeps at the PRF rate from a specific target.

Figure 4:
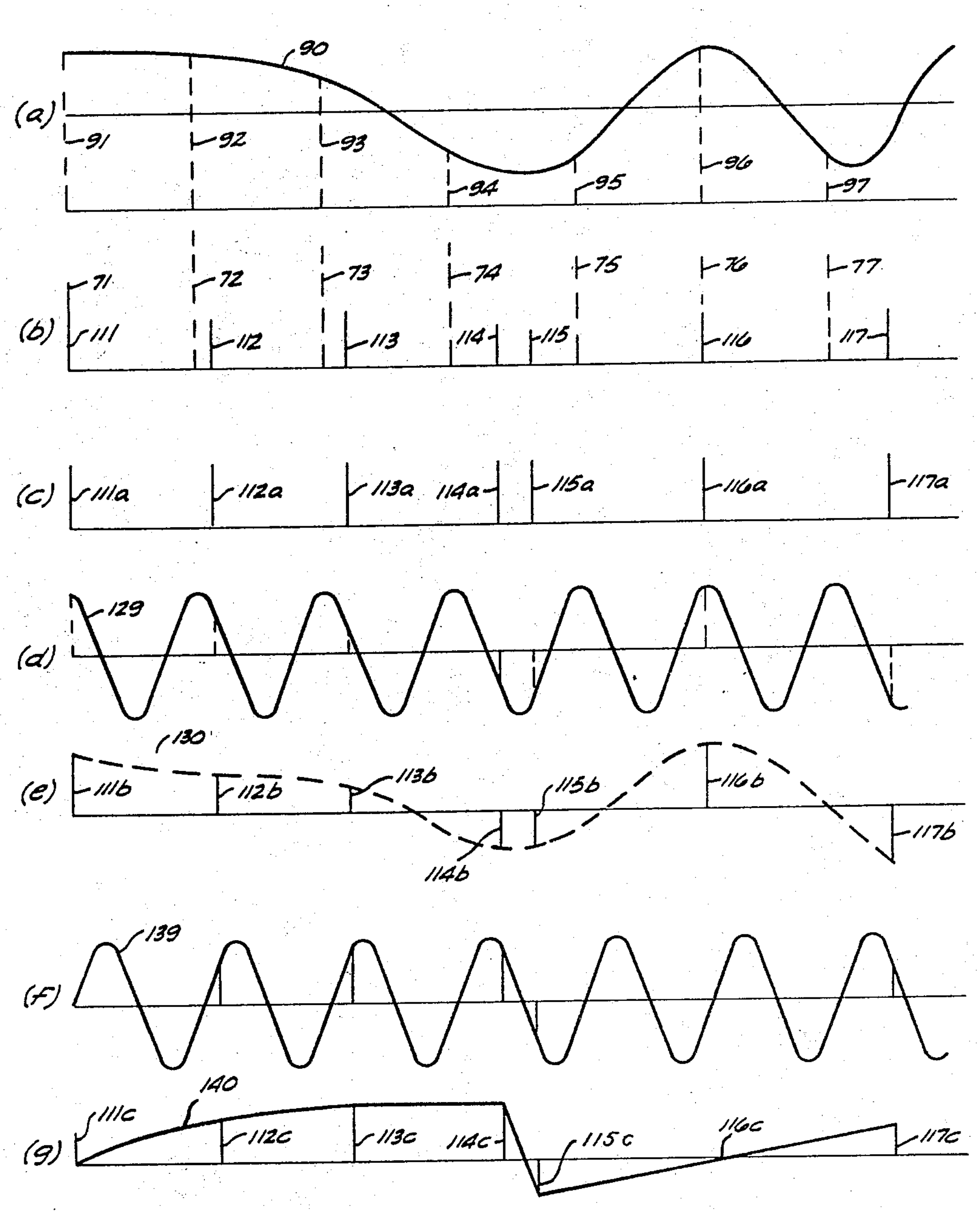

As is appreciated by those familiar with the art, the phase characteristics of radar signals received from a stationary target with a transmitter moving along a linear path which is perpendicular to a straight line between the target and the path can be expressed as cos $(at^2)$. A curve representing such a functional relationship is diagrammed in FIGURE 4(*a*) and is designated by line 90. Assuming that the phase characteristics are examined at the PRF rate shown by sample points 91 . . . 97, the phase characteristics in the first seven sweeps would indicate the following phase angles: 0°, 14.5°, 57.5°, 130°, −130°, 0°, 165.5°, etc. In FIGURE 4(*a*), equidistantly spaced lines 91 through 97 represent the PRF rate. For explanatory purposes, let it also be assumed that the spacing between any two adjacent lines 71 through 77 (FIGURE 3) also represents the PRF rate. Assuming that such a phase relationship has been recorded on the film in seven traces similar to the traces 14a through 14g, then the X positions of points 81 through 87 with respect to lines 71 through 77 respectively represent the seven phase angles herebefore referred to.

Reference is now made to FIGURE 5 which is a block diagram of the readout circuit of the present invention. As seen, a readout CRT 101 is used to scan traces 14a through 14g along the line 80. The light of the beam is focused unto a photomultiplier tube 102 by a lens 103. Thus, as the traces are scanned, the tube 102 produces a train of pulses, the amplitudes of which correspond to the intensities of points 81 through 87 and the spacings between points are related to the actual spacings on the film in the X axis. The output of tube 102 is diagrammatically represented in FIGURE 4(*b*) by pulses 111 to 117. Lines 71 through 77 have been reproduced to show the relative positions of the pulse lines with respect thereto.

The output of the photomultiplier tube 102 is supplied to a high gain amplifier 121 of a phase readout stage 120. The output of amplifier 121 is hard limited by limiter 122, whose output is diagrammed in FIGURE 4(*c*), where pulse lines 111a through 117a, related to lines 111 through 117, are shown as being of equal length. Phase readout stage 120 also includes a synchronized voltage controlled oscillator (VCO) 126 which in an errorless case as will be explained hereafter is assumed to produce a signal having a cosine waveform which is synchronized with the PRF rate. The signal is diagrammed in FIGURE 4(*d*) by line 129, hereafter also referred to as signal 129. Signal 129 is supplied to a gate 127 which is opened only by pulses 111a through 117a so that the output thereof is a series of pulses 111b through 117b, shown in FIGURE 4(*e*). The output of gate 127 is supplied to a filter 128 whose output corresponds to the dashed line 130 in FIGURE 4(*e*).

By comparing the signal represented by line 130 with the cos $(at^2)$ signal diagrammed in FIGURE 4(*a*), it is seen that the two signals are quite similar. Namely, the output of the filter 128 is a close approximation of the in-phase input signal. As seen from FIGURE 5, the phase readout stage 120 also includes a 90° phase shifting circuit 136, used to produce an output which is 90° out of phase with the output of VCO 126. The output of circuit 136 which is diagrammed in FIGURE 4(*f*) and designated by line 139, is supplied to a gate 137 which is in turn connected to a filter 138. Gate 137 is controlled in a manner similar to gate 127 so as to produce the series of pulses 111c through 117c, diagrammed in FIGURE 4(*g*). The dashed line 140 shown in FIGURE 4(*g*) represents the output of filter 138, which is a slightly distorted representation of a sin $(at^2)$ function, i.e. a quadrature signal of the input signal cos $(at^2)$ [see FIGURE 4(*a*)].

As seen from FIGURE 5, the output of the photomultiplier tube 102 is also supplied to an amplitude readout stage 150 which comprises an input circuit 150a and a delay stage 150b, whose function will be explained hereafter. The output of stage 150 which is related to the amplitudes of the pulses 111 through 117 [FIGURE 4(*b*)], is supplied to control gain amplifiers 151 and 161, which are respectively supplied with the signals represented in FIGURES 4(*e*) and 4(*g*) by lines 130 and 140. Thus, the amplifiers 151 and 161 are controlled to produce output signals which are the in-phase and quadrature signals of the original input signal provided to the recording stage 11 [see FIGURES 1 and 4(*a*)].

From the foregoing description, it becomes apparent that the recording and readout system of the present invention is capable of producing in-phase and quadrature signals related to an input signal wherein the phases of the reproduced signals are only slightly distorted. This becomes apparent by comparing the signal diagrammed in FIGURE 4(*a*) with the signals diagrammed in FIGURES 4(*e*) and 4(*g*). The distortion may be eliminated by a novel design of filters 128 and 138. Referring to FIGURE 6, there is shown the filter 128 comprising gates 162 and 163 which are connected to boxcars 164 and 165 respectively. The boxcars 164 and 165 are in turn connected to gates 166 and 167 whose outputs are connected to a summing circuit 170 which is in turn connected to the amplifier 151 through a low pass filter 171. In addition, the phase readout stage 120 (FIGURE 5) also includes a PRF oscillator 172 which, in the absence of error signals to be explained hereafter, is controlled to produce an oscillatory output, such as a cos function, diagrammatically represented in FIGURE 7(*a*) by line 174 at the PRF frequency.

The output of oscillator 172 is used to control a pulse generator 174 whose outputs are six series of control pulses, designated by the letters *j, k, l, m, n,* and *p* in FIGURES 7(*b*) through 7(*g*) respectively. As seen, control pulses *j* and *k* are generated during alternate cycles of the signal 173, while pulses *l, m, n* and *p* are generated at one-half PRF cycle intervals. As seen from FIGURE 6, pulses *j* and *k* are used to control gates 162 and 163 respectively, while gates 166 and 167 are controlled by pulses *m* and *p* respectively. Boxcars 164 and 165 are supplied with pulses *n* and *l*.

For explanatory purposes, FIGURE 4(*e*) which is the output of gate 127 (FIGURE 5) and the input to gates 162 and 163, is reproduced as FIGURE 7(*h*). As seen from FIGURES 7(*b*) through 7(*h*), considered in conjunction with the block diagram of FIGURE 6, when gate 162 is opened by the first *j* pulse, pulse 111b passes therethrough to energize boxcar 164 to produce a pulse 181 shown in FIGURE 7(*j*). The boxcar 164 is deenergized by pulse *n*. But before being deenergized, pulse *m* opens up gate 166 in order to sample pulse 181 and provide the summing circuit 170 with a pulse 111d diagrammed in FIGURE 7(*m*). Similarly, when the first pulse *k* opens gate 163, pulse 112b energizes the boxcar 165 to produce a pulse 182 until pulse *l* deenergizes boxcar 165. The output of boxcar 165, i.e., pulse 182, is diagrammed in FIGURE 7(*k*). During the period of pulse 182, a pulse *p* opens gate 167 so that pulse 182 is sampled to supply a pulse 112d to the circuit 170. As seen from FIGURES 7(*b*) through 7(*m*), subsequent control pulses enable the sampling of pulses 183 through 187, to produce pulses 113d through 117d which are related to pulses 113b through 117b respectively, the latter pulses representing the output of gate 127 (FIGURE 5). The output of circuit 170 is supplied to the filter 171 whose output corresponds to the signal represented in FIGURE 7(*m*) by line 190.

As seen from FIGURE 7(*m*), the pulses 111d–117d are reproduced at intervals of one PRF cycle which is the sampling rate of the original input signal. By comparing signal 190 with the phase characteristics of the original input signal diagrammed in FIGURE 4(*a*), it is seen that the output of filter 128 (FIGURE 6) is a very good reproduction of the original signal. However, by comparing the time relationships of pulses 111*d*–117*d* [FIGURE 7(*m*)], with respect to the samplings of the original input signal [FIGURE 4(*a*)], it is appreciated that signal 190 is delayed by one-half PRF cycle with respect to the input signal. This delay is compensated for by the delay stage 150*b* of the amplitude readout stage 150 (FIGURE 5). Stage 150*b* delays the amplitude signals by one-half a PRF cycle, so that the amplitude and phase signals supplied to amplifier 151 are in the proper time relationship to correctly reproduce the in-phase signal of the input signal.

According to the teachings of the present invention, filter 138 is identical to filter 128 and is similarly controlled by control pulses from generator 174, in order to adjust the slightly distorted phase characteristics of the quadrature signal [see FIGURE 4(*g*)]. The output of delay stage 150*b* is also supplied to amplifier 161 whose output is a corrected non-distorted quadrature signal of the original input signal.

From the foregoing description, it should be appreciated that the accuracy of the system herebefore disclosed is based on the ability to control the frequency of the signal from oscillator 172 (FIGURE 6) so that each cycle represents the PRF frequency at which the original signal was sampled. Namely, it is necessary to control the oscillator 172 so that one cycle is generated in the time required for the readout tube 101 (FIGURE 5) to scan a distance equal to the distance between any two adjacent reference lines such as lines 71 and 72 (FIGURE 3). Also, it is important that each cycle from the synchronized VCO 126 (FIGURE 5) be generated in a time required for the tube 101 to scan a distance equal to the maximum peak to peak deflection of any of traces 14*a* through 14*g*. Namely, one cycle of the VCO must represent 360° phase.

Herebefore, the invention has been described wherein the spacing between traces i.e. the PRF frequency of oscillator 172, has been assumed to be exactly equal to the maximum peak to peak deflection of any of the traces, i.e. the frequency of oscillator 126. This can be seen by comparing the signals diagrammed in FIGURES 4(*d*) and 7(*a*) which represent the outputs of VCO 126 and oscillator 172 respectively. It is appreciated that in order to achieve such conditions where 360° deflection or phase corresponds to the spacing between traces (FIGURE 3) it would be necessary to insure that the recording amplifiers, such as sweep amplifier 52, are very carefully controlled with respect to the operation of a film moving circuit designated in FIGURE 1 by reference numeral 201. Namely, it would be necessary to precisely control the speed of the film, the recording amplifiers and oscillators 126 and 172 so that each cycle properly represents the necessary phenomenon.

Such strict requirements can be greatly minimized by recording on the film 13 by a plurality of marks, which during readout can be used to synchronize the PRF oscillator 172 and the VCO 126 to produce two independent signals which do not have to be of the same frequency, but which are related to the spacing between traces and 360° deflection respectively. For a better understanding of how these marks are recorded and used, reference is again made to FIGURE 3, which is an expanded view of the film 13 in which the seven traces 14*a* through 14*g* are diagrammed. As previously explained, the relative phases of the signals in each trace, such as trace 14*a*, are recorded as X modulations with respect to a reference position or line in the Y axis, such as line 71. As seen from FIGURE 3, along one side of the film, prior to recording each trace, a pair of marks are also recorded, such as marks 71*a* and 71*b*. The marks represent −180° deflection and +180° deflection of the signals in trace 14*a* with respect to line 71. Similarly, a pair of marks is associated with each of traces 14*b* through 14*g*. The suffix *a* is associated with each mark designating numeral representing −180° deflection with respect to the particular reference line and the subscript *b* is associated with a numeral representing +180° deflection.

In practice, the circuit 201 and amplifier 52 [see FIGURE 1] are generally controlled so that the spacing between adjacent marks with the same subscript, such as 71*a* and 72*a*, representing the PRF rate, is slightly greater than the spacing between marks, such as 71*a* and 72*b*. Namely, the film is moved during a PRF interval by a distance slightly greater than the maximum peak to peak deflection, representing 360° phase. During readout, the marks are first scanned to produce control signals, used to synchronize the PRF oscillator 172 so that each cycle of signal 173 [FIGURE 7 (*a*)] is generated in a time interval required to scan the distance between adjacent marks with the same subscript (71*a* and 72*a*), while VCO 126 is synchronized to produce a cycle of signal 129 [FIGURE 4(*d*)] in the time required to scan the distance between 71*a* and 71*b* which represent 360° deflection.

For a better understanding of this aspect of the invention, reference is made to FIGURE 8 which is a block diagram of circuitry required to control the VCO 126 (FIGURE 5) and the PRF oscillator 172 (FIGURE 6). The circuitry forms a part of the phase readout stage 120 (FIGURE 5) herebefore referred to. FIGURES 9(*a*), 9(*b*) and 9(*c*) to which reference is also made herein represent waveforms which are useful in explaining the operation of the circuitry shown in FIGURE 8. FIGURE 9(*a*) represents the marks 71*a*, 71*b*, 72*a*, etc. shown in FIGURE 3. As seen from FIGURE 8, these marks read out by the photomultiplier tube 102 (FIGURE 5), are supplied to a synchronizing stage 210 in the form of pulses. Therein, the received pulses are converted into two related series of pulses 71*c* through 77*c* and 71*d* through 77*d* diagrammed in FIGURES 9(*b*) and 9(*c*) respectively. $\tau$ represents the period or width of pulses 71*c* through 77*c*, while $\mu$, which is assumed to be much less than $\tau$, is the time width of pulses 71*d* through 77*d*.

Pulses 71*c* through 77*c*, after passing through a low pass filter and being properly phase shifted in stage 210, are used to control the oscillator 172 so that one cycle is generated between the positive leading edges of adjacent pulses shown in FIGURE 9(*b*), as indicated by the dashed line 215. Also, pulses 71*c* through 77*c*, pulses 71*d* through 77*d* and the outputs of VCO 126 and circuit 136 are supplied to a VCO synchronizing circuit 220, which is used to control the VCO 126 so that during the duration of each of pulses 71*c* through 77*c*, a single complete cycle is generated therein.

As seen from FIGURE 8, circuit 220 comprises integrators 221 through 224, with 222 and 223 being supplied with pulses 71*c* through 77*c* and integrators 221 and 224 being operated on by pulses 71*d* through 77*d*. Also, integrators 223 and 224 are supplied with the output of VCO 126 which, for explanatory purposes, is assumed to supply a signal of $\cos\phi$. The output of circuit 136 which is supplied to integrators 221 and 222 is therefore $\sin\phi$. Let us assume that $$\omega\tau=2\pi+\alpha$$

where $\tau$ is the period of the turn on time shown in FIGURE 9(*b*) and the phase error $\alpha<<1$, then the outputs of integrators 223 and 222 are $$\int_{\phi_0}^{\phi_1+2\pi+\alpha}\sin\phi_0 d\phi\simeq\alpha\cos\phi_0$$

and $$\int_{\phi_0}^{\phi_0+2\pi+\alpha}\cos\phi d\phi\simeq\alpha\sin\phi_0$$

respectively. Here $\phi_0$ is the unknown starting phase at the beginning of each integration period. Similarly, it can be shown that integrators 221 and 224 have outputs $\mu\sin\phi_0$ and $\mu \cos \phi_0$ where $\mu$ is the constant turn-on time $\mu$ of FIGURE 9(*c*). The outputs of integrators 221 and 222 after being boxcarred in boxcars 231 and 232, are supplied to a multiplier 230, whose output is $\mu\alpha \sin^2 \phi_0$. Similarly, the outputs of 223 and 224 are supplied, through respective boxcars 233 and 234, to a multiplier 235 whose output is $\mu\alpha \cos^2 \phi_0$. The outputs of both multipliers are supplied to a summing circuit 240, the output of which $\mu\alpha$, is supplied to an integrating stage 245. $\mu$ is much less than one and $\alpha$ represents the error in the frequency of the VCO 126 necessary to produce one cycle in a time period $\tau$. Stage 245 is connected to the VCO 126 to form a closed feedback loop in order to reduce the value of $\alpha$, i.e. the error, to zero. When this condition is reached, the frequency of the VCO is held constant while scanning the traces [see FIGURE 3] on the film which contain the desired amplitude and phase information of the original signals.

From the foregoing description in connection with FIGURES 8 and 9 and the marks **71*a*–77*a* and 71*b*–77*b* shown in FIGURE 3, it should be appreciated that the marks can be used to control two oscillators to produce two independent frequencies which are not necessarily harmonics of each another. The frequency of the oscillator 172 is a function of the spacing between the leading edges of pulses 71*c* through 77*c*, while the frequency of the oscillator 126 is dependent on the time width or period $\tau$ of the pulses 71*c* through 77*c***. Thus, by properly controlling the relative period $\tau$ with respect to the spacings between the leading edges of adjacent pulses, the circuitry herebefore described could be utilized to produce two frequencies which are related to each another by a value which need not be an integer.

There has been accordingly shown and described hereinbefore a novel and useful data recording and readout system wherein amplitude and phase characteristics of input signals are recorded on a two-dimensional medium from which the characteristics can be read out to reproduce the input signals as well as quadrature signals thereof. Although the invention has been described in conjunction with recording the data on film it is apparent that other means may be used as the recording means in which data may be recorded and from which the data may be read out at any later time. As seen from FIGURE 10, to which reference is made herein, an electrical readin and readout storage tube 261, may be connected to sweep amplifier 52 (FIGURE 1) and sweep generator 66 so that the data, instead of being recorded on the film 13, may be recorded on the storage surface of the tube.

As is well known in the art, data may be stored in such tubes by controlling the charge densities of discrete points or incremental areas of the storage surface. Thus, the relative charge densities correspond to the intensity of film exposure and the location of the points relate to the phase characteristics of the input signals. The tube 261 is also connected to the high gain amplifier 121 (FIGURE 5) and the input circuit **150*a* (FIGURE 5), the latter two circuits forming a part of the readout system. Thus, the tube 261** may supply the phase and amplitude characteristics of the stored signal for analysis and subsequent readout.

It should be appreciated that those familiar with the art may modify the arrangements as shown without departing from the true spirit of the invention. Therefore, all modifications of the arrangements as shown or equivalents thereof are deemed to fall within the scope of the invention as claimed in the appended claims.

What is claimed is:

1. A system for recording the amplitude and phase characteristics of a plurality of electrical signals received from a source of signals and for reading out the recorded signals to produce signals related thereto comprising:

means for converting the amplitude characteristics of each of said electrical signals into first signals and the phase characteristics of each of said received signals into second signals;

recording means including a recording medium responsive to said first and second signals for recording the amplitude and phase characteristics of said plurality of electrical signals as a plurality of exposed points on said recording medium, the intensities of exposure of said points being related to the amplitudes of said electrical signals and the relative positions of said points with respect to a predetermined reference direction being related to the phase characteristics of said electrical signals;

means for scanning said plurality of recorded points for producing a plurality of pulses, related to the intensities of exposure of said points, the spacing between adjacent pulses being related to the spacing between adjacent points on said recording medium;

oscillatory means for providing a first oscillatory signal;

gated filtering means responsive to said plurality of pulses and said first oscillatory signal for producing a composite output signal having amplitude and phase characteristics related to the amplitude and phase characteristics of said plurality of received electrical signals.

2. A system as recited in claim 1 wherein said oscillatory means includes means for providing a second oscillatory signal which is 90° out of phase with respect to said first oscillatory signal and said gated filtering means being responsive thereto to provide a quadrature output signal with respect to said composite output signal.

3. A system for recording amplitude and phase characteristics of a plurality of electrical signals from a source of signals comprising:

input means for receiving each of said plurality of electrical signals having amplitude and phase characteristics;

first means for providing first signals related in amplitude characteristics to the amplitudes of each of said respective received signals;

second means for providing second signals linearly related in the phase characteristic to the phase characteristics of each of said respective received signals; and recording means having a sensitized recording surface, responsive to said first and second signals for exposing incremental areas on said recording surface to record the amplitude and phase characteristics of said plurality of electrical signals thereat, the intensity of exposure of each incremental area being related to the amplitude of said electrical signals and the relative location of the incremental area on said recording surface with respect to a predetermined direction being related to the phase of said electrical signals.

4. A system for recording the amplitude and phase characteristics of a plurality of electrical signals corresponding to repeated observations at a predetermined rate of a physical phenomenon comprising:

input means for receiving each of said plurality of electrical signals having amplitude and phase characteristics;

first means for providing first signals related to the amplitudes of said received signals;

second means for providing second signals linearly related to the phase characteristics of said received signal; and recording means having a recording surface, responsive to said first and second signals for exposing incremental areas of said recording surface, said areas being disposed along a reference direction to record the amplitude and phase characteristics of said plurality of electrical signals, the intensity of exposure of each incremental area and the relative position thereof in said reference direction being related to the amplitude and phase characteristics of another one of said electrical signals.

5. A system as recited in claim 4 wherein said recording means include a cathode ray tube having an electron beam, a recording surface, intensity control means for modulating the intensity of said electron beam, and position control means for modulating the position of said electron beam at said surface, said intensity control means being responsive to said first means for modulating the intensity of said electron beam as a function of the detected amplitudes of said received signals, said position control means being responsive to said second means for modulating the position of said electron beam at said recording surface as a function of the phase characteristic of each of said received signals, whereby the amplitude and phase characteristics of said received signals are recorded in said reference direction with respect to said recording surface as a plurality of recorded points, the intensity of said points and the relative spacings therebetween with respect to predetermined positions along said reference direction being functions of the amplitudes and phase characteristics of said received signals, respectively.

6. A system as recited in claim 5 wherein said recording means include a sensitized film, means for moving said film in a predetermined direction with respect to the recording surface of said cathode ray tube, whereby the amplitude and phase characteristics of said electrical signals are recorded on said film by exposing said film at a plurality of points with light from said electron beam impinging on said recording surface, the intensities of exposure of said points being related to the amplitudes of said electrical signals and the relative spacings of said points in said predetermined reference direction being related to the relative phase characteristics of said electrical signals.

7. A system as recited in claim 4 wherein said recording means comprises storage tube means having a storage surface for storing the amplitude and phase characteristics of said plurality of electrical signals on said storage surface as a function of electron charges deposited on said surface at a plurality of points thereof.

8. A recording system for recording the amplitude and phase characteristics of received signals in a radar sweep as a trace on a two-dimensional recording medium wherein the amplitude of each signal is recorded as a function of the exposure intensity of said recording medium and the phase characteristic of each signal is recorded as a function of the position of exposing the recording medium with respect to a reference line comprising:

input means for receiving each signal in a radar sweep, each received signal having amplitude and phase characteristics;

first means for detecting the amplitude characteristics of each received signal and for providing first signals corresponding to the amplitude characteristics of each received signal;

second means for detecting the phase characteristic of each signal and for converting said phase into a related linearly varying second signal;

a two-dimensional recording medium; and recording means responsive to said first and second means, said recording means including means for exposing the recording medium to record thereon the amplitude of each signal by controlling the exposure of said medium, said recording means further including means responsive to said second signal for recording the phase characteristics of each signal by controlling the position said medium is exposed with respect to a reference position thereon.

9. A recording system as recited in claim 8 wherein said second means include means for generating a first reference signal and a second reference signal which is 90° out of phase with respect to said first reference signal, and means for combining the received signal with said first and second reference signals to produce said second signal having an amplitude which is linearly related to the phase characteristic of said received signal.

10. A system for reading out a series of signals recorded on an exposure sensitive recording medium as a plurality of exposed points to produce a composite signal related to said signals comprising:

an exposure sensitive recording medium having a plurality of exposed points, each point having an exposure intensity related to the amplitude of one of said signals, and the positional relationships between said points being related to the phase characteristics of said signals;

means for reading out the exposure intensity of each of said points and their positional interrelationships for producing a series of pulses, each pulse having an amplitude related to the exposure intensity of a related point, the spacing between pulses being related to the positional relationships of said points in said recording medium;

phase means for producing as a function of the relative spacings between said pulses a composite phase signal having phase characteristics which are related to the phase characteristics of said recorded signals;

amplitude means for analyzing the amplitudes of said pulses in said series for deriving the amplitudes of said signals related thereto; and output means responsive to the outputs of said phase means and amplitude means for producing a composite signal having amplitudes and phase characteristics related to the signals recorded on said exposure sensitive recording medium.

11. A system as recited in claim 10 wherein said phase means include means for generating a first reference signal and a second reference signal which is 90° out of phase with respect to said first reference signal, means for producing in-phase and quadrature phase signals, the quadrature signal having phase characteristics which are 90° out of phase with respect to the phase characteristics of the in-phase signal, and wherein said output means include means responsive to said in-phase and quadrature phase signals and responsive to said amplitude means for producing a composite in-phase signal and a composite quadrature signal as a function of the amplitude and phase characteristics of the signals recorded on said exposure sensitive recording medium.

12. A system as recited in claim 10 wherein said exposure sensitive recording medium comprises a strip of film having a plurality of points exposed along a first axis thereof, each point having an exposure intensity related to the amplitude of a recorded signal, and the spacing thereof in said first axis being related to the phase characteristics of said recorded signal, said means for reading out including scanning means for scanning said plurality of points for producing said series of pulses.

13. A system as recited in claim 10 wherein said exposure sensitive recording medium comprises a recording surface of an electronic storage tube, having a plurality of points exposed along a first axis thereof, each exposed point having a charge density related to the amplitude of a recorded signal, and the position thereof along said first axis being related to the phase characteristics of said recorded signal.

14. A system as recited in claim 12 wherein said phase means include means for generating a first reference signal and a second reference signal which is 90° out of phase with respect to said first reference signal, means for producing in-phase and quadrature composite phase signals, the quadrature phase signal having phase characteristics which are 90° out of phase with respect to the phase characteristics of the in-phase composite phase signal, means included in said output means responsive to said in-phase and quadrature composite phase signals and said amplitude means for producing composite in-phase and composite quadrature output signals related to the signals recorded on said recording surface of said storage tube.

15. A system for generating an oscillatory cyclic signal each cycle being of a duration substantially equal to the duration of each pulse in a train of repetitive pulses comprising:

generating means for generating a first train of repetitive pulses each pulse being of a predetermined duration, said generating means including means for generating a second train of repetitive pulses, each pulse in said second train being related to another pulse in said first train and of a time duration substantially shorter than the duration of each pulse in said first train of repetitive pulses;

controlled oscillator means for generating a first oscillatory cyclic signal, each cycle thereof having a duration which differs from the duration of each pulse in said first train by not more than a predetermined value;

oscillatory means responsive to said first oscillatory cyclic signal for generating a second oscillatory cyclic signal which is 90° out of phase with respect to said first oscillatory cyclic signal;

control means including integrating means responsive to the pulses of said first and second trains of pulses and said first and second oscillatory cyclic signals, and multiplying and summing means for producing an error signal which is a function of the difference between the duration of each cycle of said first oscillatory cyclic signal and the duration of each pulse in said first train of pulses; and means for energizing said controlled oscillator means with said error signal to control the duration of each cycle of said first oscillatory cyclic signal to be substantially equal to duration of each pulse in said first train of repetitive pulses.

16. A system as recited in claim 15 wherein said control means includes a first integrator responsive to said first oscillatory cyclic signal and pulses in said first train for producing a first integrated signal, a second integrator responsive to said first oscillatory cylic signal and pulses in said second train of pulses for producing a second integrated signal, a third integrator responsive to said second oscillatory cyclic signal and pulses in said first train for producing a third integrated signal, a fourth integrator responsive to said second oscillatory cyclic signal and pulses in said second train of pulses for producing a fourth integrated signal, first and second multiplying means for multiplying said first and second integrated signals to produce a first product signal and for multiplying said third and fourth integrated signals to produce a second product signal, and means for combining said first and second product signals to produce said error signal for controlling the duration of each cycle of the first oscillatory cyclic signal generated by said controlled generating means to be equal to the duration of each pulse in said first train of repetitive pulses.

No references cited.

RODNEY D. BENNETT, *Primary Examiner.*